United States Patent [19]
Bozzolato

[11] Patent Number: 5,191,370
[45] Date of Patent: Mar. 2, 1993

[54] MULTI-SECTION HELICOPTER-BORNE ROTATABLE BEAM, SPECIALLY ADAPTED TO SUPPORT RANGE-FINDER CAMERAS AND TELEVISION FOCUSING CAMERAS FOR STEREOPHOTOGRAMMETRIC SURVEYS

[75] Inventor: Giovanni Bozzolato, Navacchio, Italy

[73] Assignee: Agip S.P.A., Milan, Italy

[21] Appl. No.: 756,153

[22] Filed: Sep. 6, 1991

[30] Foreign Application Priority Data

Sep. 18, 1990 [IT] Italy ................................ 21504 A/90

[51] Int. Cl.$^5$ ............................................. G03B 29/00
[52] U.S. Cl. ....................................... 354/81; 354/293; 244/118.1; 244/137.4
[58] Field of Search ............... 354/81, 293; 244/118.1, 244/137.4

[56] References Cited
FOREIGN PATENT DOCUMENTS
2168940A 7/1986 United Kingdom .

Primary Examiner—Michael L. Gellner
Assistant Examiner—Howard B. Blankenship
Attorney, Agent, or Firm—Morgan & Finnegan

[57] ABSTRACT

A multi-section helicopter-borne rotatable beam for supporting at either of its ends range-finder cameras and television focusing cameras for stereophotogrammetric surveys, in which the central tubular section is rotated by means of an electric motor and return springs and supported by two collars mounted rotatably by means of hinged constraints on a base fixed rigidly to the floor of the helicopter cab and the two truncated-cone tubular-structure side sections of the beam are secured to the central section by a telescopic coupling arrangement ensured by half-ring ties co-operating with flanges of the sections and by through pins and safety split pins, the above-mentioned cameras being supported by prismatic box frames in their turn supported, by means of a dampening system comprising springs and double-acting shock absorbers, inside housings or pods with a ventral opening, which can be closed with an internally-sliding door, and a plexiglass portable. Variants are also envisaged.

4 Claims, 9 Drawing Sheets

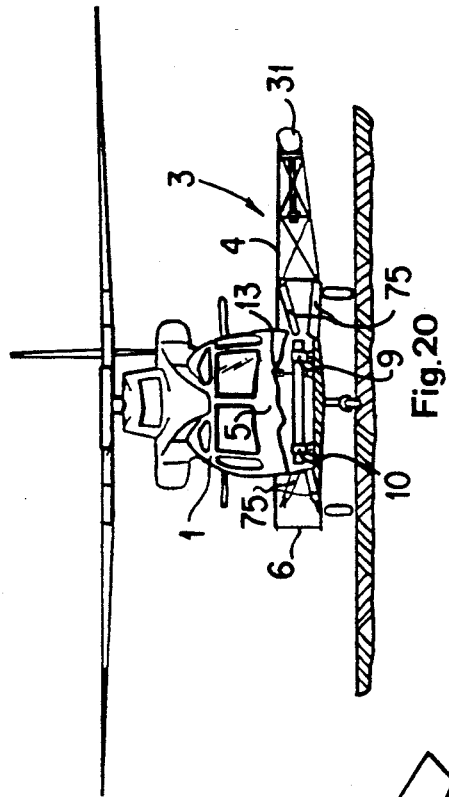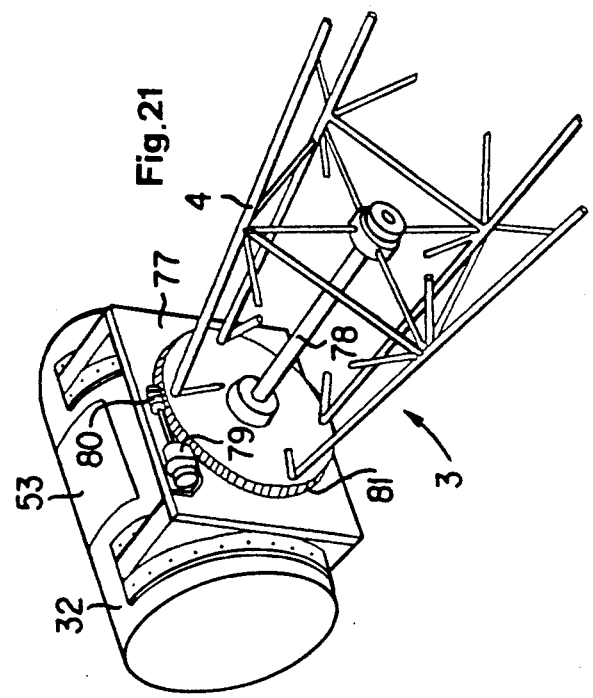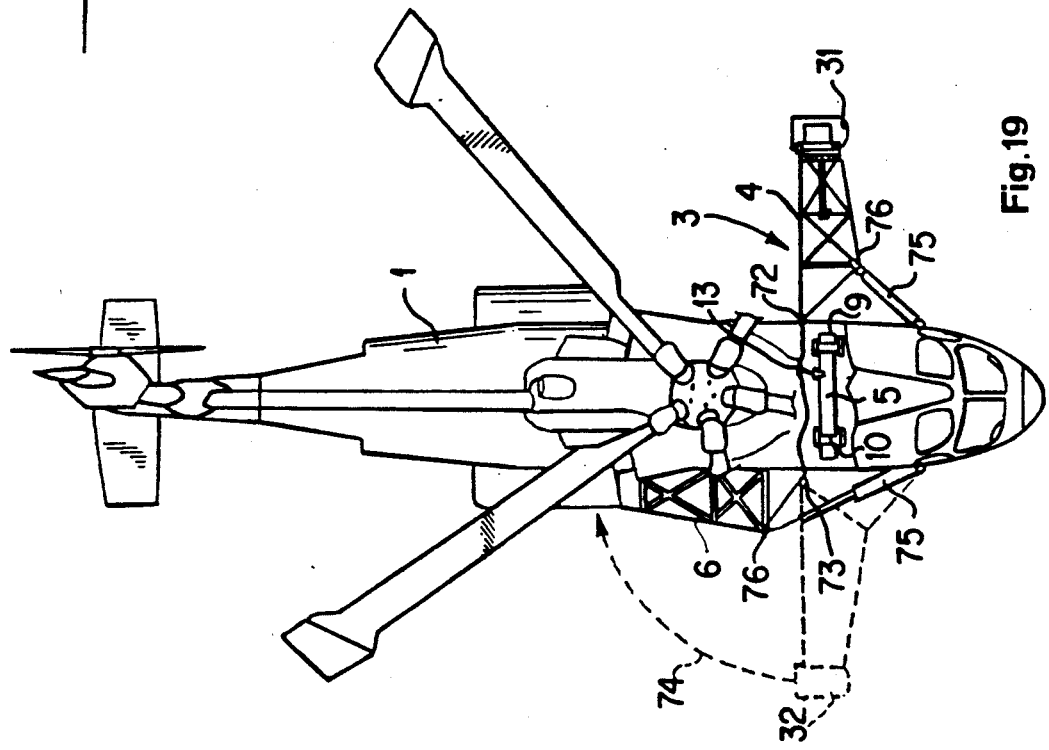

MULTI-SECTION HELICOPTER-BORNE ROTATABLE BEAM, SPECIALLY ADAPTED TO SUPPORT RANGE-FINDER CAMERAS AND TELEVISION FOCUSING CAMERAS FOR STEREOPHOTOGRAMMETRIC SURVEYS

The present invention relates to a new multi-section helicopter-borne rotable beam, specially adapted to support range-finder cameras and television focusing cameras for stereophotogrammetric surveys, which, having its rotation motorised and with special means of securing the sections together, ventral-type shooting openings in the camera pods as well as various other arrangements which enable its length to be extended by more than 6 meters and in the order of 10 meters, with the consequent possibility of surveying at greater distances whilst maintaining the high precision required, makes it possible to strengthen the performance and versatility of use of the said beam and thus solve more rapidly, cheaply and simply the more complex problems of stereophotogrammetric surveying.

From the state of the art, and more precisely from our previous UK Patent No. 2 168 940 of Jun. 8, 1988 a helicopter-borne rotatable beam for supporting range-finder cameras capable of performing industrial stereophotogrammetric surveys is already known. The said known beam essentially comprises three cylindrical tubular sections connected together in succession by means of sturdy flanges of considerable size, of which the central section is supported rotatably by three clamp collars each supported by two double-acting cylindrical shock absorbers fixed onto a base which is bolted to the floor of the helicopter cab, and is rotated manually, through an angle of up to 180°, by means of a mechanical handwheel system. Furthermore, the cameras are supported by cylindrical frames which in their turn are supported, by means of two complex vibration-absorption systems comprising respectively two radial sets of three and three superimposed co-axial pairs of double-acting shock absorbers, inside housings or pods fixed to the ends of the beam, such housings having front shooting openings which can be closed by "eyelid" type doors.

Such a known embodiment presents a series of problems, however, the main one being the limitation in length of the beam to a maximum of 6 meters due to the presence of the flanges connecting the sections which, since they must be of considerable size to stiffen the system to the maximum, considerably weigh it down thus preventing beam lengths of more than 6 meters being achieved which in fact are currently required by the most recent demands within the field of photogrammetry.

Moreover, the knowledge gained from bench tests, flight tests and operational experiments with the known beam have proved that in actual fact the double-acting cylindrical shock absorbers are of no use in supporting the central section of the beam on the base since they cause unwanted imbalances and disturbances which are accentuated if the helicopter has a rotor with an odd number of blades since in this case the blades produce an assymmetrical thrust alternately on the left- and right-hand ends of the beam with a consequent unacceptable oscillatory movement of the beam itself. Furthermore, manual rotation of the beam by means of a handwheel, given the relatively high weight of the system, requires high gearing down and so the operator is forced to turn the handwheel many times at high speed in order to maintain the framing which is thus difficult and requires long periods of time especially when the helicopter is subjected to gusts of wind or various forms of turbulence.

Lastly, adopting single front shooting openings with "eyelid" type doors in the camera pods, apart from involving a 180° rotation of the beams to bring the said openings from the front position for photoperspective shots to the rear position required for transfer flights, does not enable the subject to be surveyed to be continuously monitored by the television cameras during the approach stage since, in order to protect the lenses of the said cameras from adverse atmospheric conditions, the said openings are opened only at the instant and for the sole time required to take the stereophotographic shot.

The aim of the present invention is precisely to avoid the above-mentioned problems and supply a multi-section helicopter-borne rotatable beam, specially adapted to support range-finder cameras and television focusing cameras for sterophotogrammetric surveys, which may have a length of over 6 meters, in the order of 10 meters, maintaining the high degree of precision required by the demands of current stereophotogrammetric surveys.

This is essentially possible due to the fact that the two side sections of the multi-section beam comprise truncated-cone shaped tubes slightly tapered towards the outer ends for aeronautical reasons and to keep the deflection deriving from static and dynamic stress as slight as possible, the inner ends of which connect telescopically into the ends of the tubular central section of the beam where they are held in position by half-ring ties and through pins with a safety split pin. In this way, apart from being able now easily to achieve beam lengths of as much as 10 meters, given the extreme and ensured rigidity of the coupling, it is also easy for the helicopter to carry the three parts of the beam despite the length of the latter.

Moreover, the above-mentioned tubular central section of the helicopter-borne rotatable beam is fixed to a base in its turn directly bolted to the floor of the helicopter cab, by means of two collars mounted rotatably in an axial direction on the said base by means of hinged constraints so that in this way the beam is able to deflect elastically to compensate the now considerable vertical acceleration thrusts, positive or negative, of the helicopter resulting for example from air-pockets, rising currents, sharp landings or takeoffs, etc.

The said collars thus enable the helicopter-borne beam to rotate around its own longitudinal axis by however much is desired and this rotation is now performed mechanically with precision by means of the action of an electric motor (actuator) which moves the projecting arm of the said central section of the beam vertically, the said action being balanced by at least one return spring. Furthermore, on the said central section there is also a lever for manual emergency rotation of the beam into the position required by the attitude of flight of the helicopter, in the event of failure of the electrical actuator.

The cylindrical housings or pods located at either end of the helicopter-borne rotatable beam, now have in their lower part a ventral rectangular opening, which may be opened by means of an electrically-operated internally-sliding door, for the range-finder camera shots as well as an aeronautical plexiglass porthole, behind the said opening, for the television focusing camera, offering the double advantage of requiring no rotations for nadiral shots and reducing to only about 105° the rotation of the beam required for focusing the range-finder cameras in frontal shots, with a consequent substantial obvious simplification of the vibration-absorption structures, as well as enabling continuous visual control of the range-finder cameras through the respective portholes. Moreover, in the said housings or pods the said range-finder cameras and television focusing cameras are supported by prismatic box frames which, apart from being relatively simple and cheap structures, enable considerable simplification of the vibration damping system which may now be achieved with less sophisticated and therefore less expensive elements, the said system essentially comprising several sets of simple springs as well as pairs of double-acting return shock absorbers acting in the three directions of the orthogonal co-ordinates.

According to a variant of the present invention, the said two side sections of the helicopter-borne rotatable beam each comprise two cylindrical sub-sections which may be inserted into each other telescopically and into the said central section, which improves the aerodynamic conditions of the helicopter during transfer flights, conditions which are further improved by the fact that the rear end of the said cylindrical housings or pods are streamlined in such a way as aerodynamically to match the configuration of the helicopter sides.

According to another variant of the present invention the said two side sections of the helicopter-borne rotatable beam instead comprise two truncated-pyramid lattice structures which, having greater rigidity and less resistance to air and consequently a lower weight in comparison to the cylindrical beam, may be bolted on directly, even though they are of a considerable length, to the ends of the central section of the beam and therefore rotate with the latter, or may be hinged to opposite sides of the helicopter and made to fold backwards against the said sides by means of hydraulic jacks. In this last variant the said housings or pods have no ogival end pieces since these would interfere with the folding operation and in fact they are not required since the housings are folded back against the fuselage during flight and furthermore rotation is limited to the said housings or pods only located at either end of the said folding lattice sections, this being achieved by the action of repeater motors (Veltro) which, mounted on the said housings or pods, are controlled from the said actuator motor of the central section of the beam, which acts as a master motor.

Finally, the multi-section helicopter-borne rotatable beam, in the order of over 6 meters long, for supporting at either of its ends two range-finder cameras and two television focusing cameras for stereophotogrammetric surveys, the said beam projecting beyond the two sides of a helicopter at right angles to the helicopter's axis and comprising a multi-section structure of which the cylindrical central section and side sections are connected in succession together by securing means and in which the central section is supported rotatably by supporting means mounted on a base or bed which in its turn is fixed to the floor of the helicopter cab, and is made to rotate around its longitudinal axis by operating means, the said beam supporting at its ends two cylindrical housings or pods with ogival rear and front ends for the said range-finder cameras and television focusing cameras which operate through openings in the said housings or pods and are supported removably in containers connected to the respective housings or pods by means of a vibration damping system, is characterised according to the present invention in that the said side sections are truncated-cone tubular structures tapered towards the outer ends of the beam, that the said securing means comprise a telescopic connection of the inner ends of the said side sections respectively in the ends of the said central section of the beam, the said connection being secured in position by means of half-ring ties with an internal annular groove co-operating with appropriate flanges on the ends of the central section and on the said side sections respectively, as well as by means of pins passing through the said sections connected together and safety split pins, that the said means of support of the central section consists in two collars mounted rotatably in an axial direction on the said base by means of hinged constraints, that the said operating means make the said central section of the beam rotate by up to about 105° and consist in an electric actuator supported by a plate which is integral with the said base, the said actuator vertically moving in both directions a spindle hinged on an arm projecting from one side of the said central section, there being hinged on an arm projecting from the opposite side of the latter central section one or more return springs and on one end of the said central section there being also a lever for manual emergency rotation of the said section, that the said openings in each of the said housings or pods consist in a ventral rectangular window which can be opened by means of a curved internally-sliding door operated by an electric motor which moves toothed wheels co-operating with curved racks of the said door, for the range-finder camera shots, as well as in an aeronautical plexiglass porthole, located behind the above-mentioned window, for the television focusing camera, and that the above-mentioned containers for the said cameras each comprise a prismatic box frame whose vibration damping system consists in a set of four springs diverging from the tops of the front part of the said frame, in a second set of two pairs of return springs fixed to the rear part of the frame as well as in pairs of double-acting return shock absorbers acting along the longitudinal, transverse and vertical directions of the frame itself.

According to a variant of the present invention, the multi-section helicopter-borne rotatable beam according to claim 1 is characterised in that the said two side sections which support at their outer ends the said cylindrical housings or pods respectively each comprise two cylindrical sub-sections which can be inserted telescopically into each other and into the said central section by means of an electromechanical control device, the rear end of the said cylindrical housings or pods being streamlined so as to match aerodynamically the configuration of the helicopter sides.

According to another variant of the present invention, the multi-section helicopter-borne rotatable beam is characterised in that the two said side sections which support at their outer ends the said cylindrical housings or pods comprise two truncated-pyramid lattice structures tapered towards the outer ends of the beam, which are rigidly fixed to the ends of the said rotatable central section of the beam itself.

According to an additional variant of the present invention, the multi-section helicopter-borne rotatable beam is characterised in that the said two side sections which support at their outer ends the said cylindrical housings or pods comprise two truncated-pyramid side structures tapered towards the outer ends of the beam, which are hinged by their inner rear end to the sides of the helicopter and can be folded back against the said sides by means of the action of hydraulic jacks hinged between the said sides and the inner front end of the said lattice structures respectively, the said cylindrical housings or pods being supported rotatably to the outer end of the said lattice structures each by means of a supporting plate pivoting on the outer end of the said structure and rotated by an electric repeater motor (Veltro) mounted on the said supporting plate and operating an endless screw co-operating with a circular rack which is integral with the said lattice structure, the said motor being in its turn controlled by the said electrical actuator which operates the said central section of the beam.

The invention is now better explained with reference to the attached drawings which illustrate preferred forms of practical embodiments given purely by way of example and in no way limiting since technical or constructional variations may always be made without going beyond the scope of the present invention. In the said drawings:

FIG. 1 is an axonometric view of a helicopter fitted with the multi-section helicopter-borne beam for supporting range-finder cameras and television focusing cameras for stereophotogrammetric surveys built according to the invention, the said beam being rotated so that the cameras are pointing vertically downwards in the optimum position for nadiral stereophotographic shots and for transfer flights;

FIG. 19 is a top view of a helicopter with a multi-section helicopter-borne rotatable beam comprising, according to a further variant of the invention, a tubular central section and two lattice-structure side sections which can be folded back against the sides of the helicopter, the housings or pods being supported rotatably at the ends of the said folding lattice side sections, FIG. 20 is a front view of the embodiment shown in FIG. 19;

FIG. 21 is and enlarged-scale axonometric view of the rotatable mounting of a housing or pod at the end of a folding lattice side section in the embodiment shown in FIG. 19.

Figure 1:
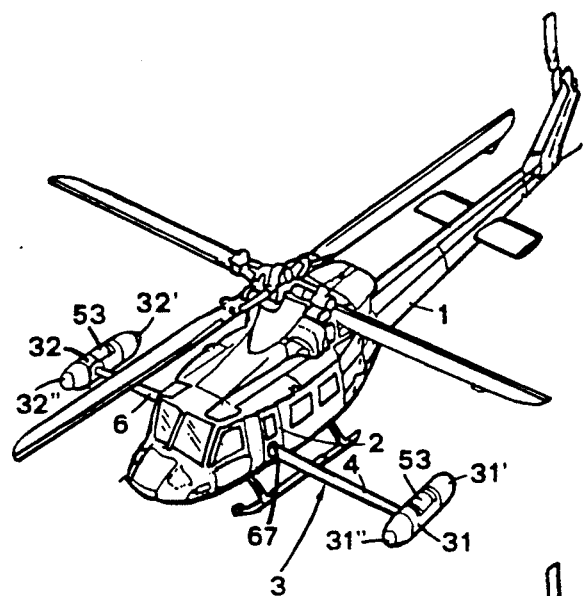
Figure 2:
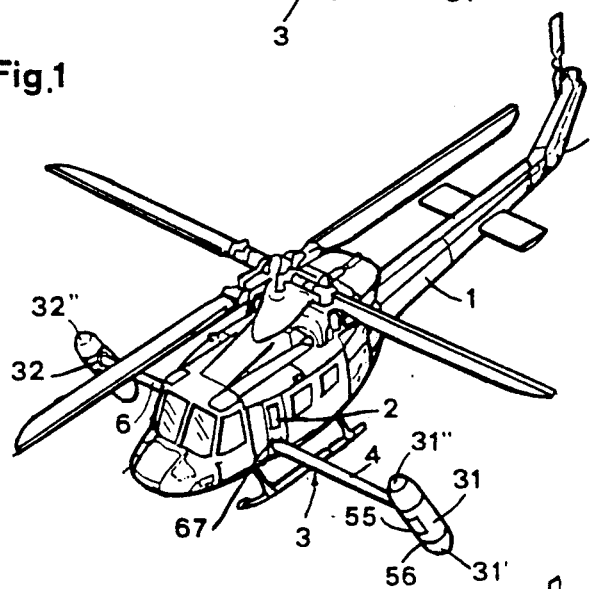
FIG. 2 is an axonometric view similar to that of FIG. 1, in which the said beam is rotated so that the cameras are inclined at any angle to take panoramic stereophotographic shots.
Figure 3:
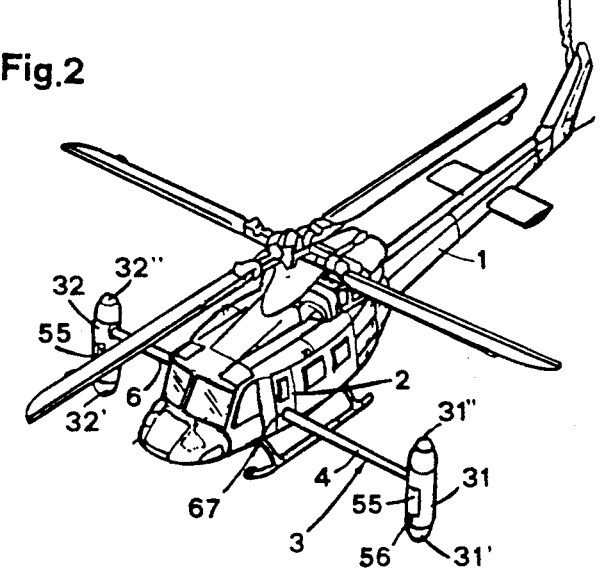
FIG. 3 is also an axonometric view similar to that of FIG. 1 in which the said beam is rotated by about 90° to take frontal stereophotographic shots.
Figure 7:
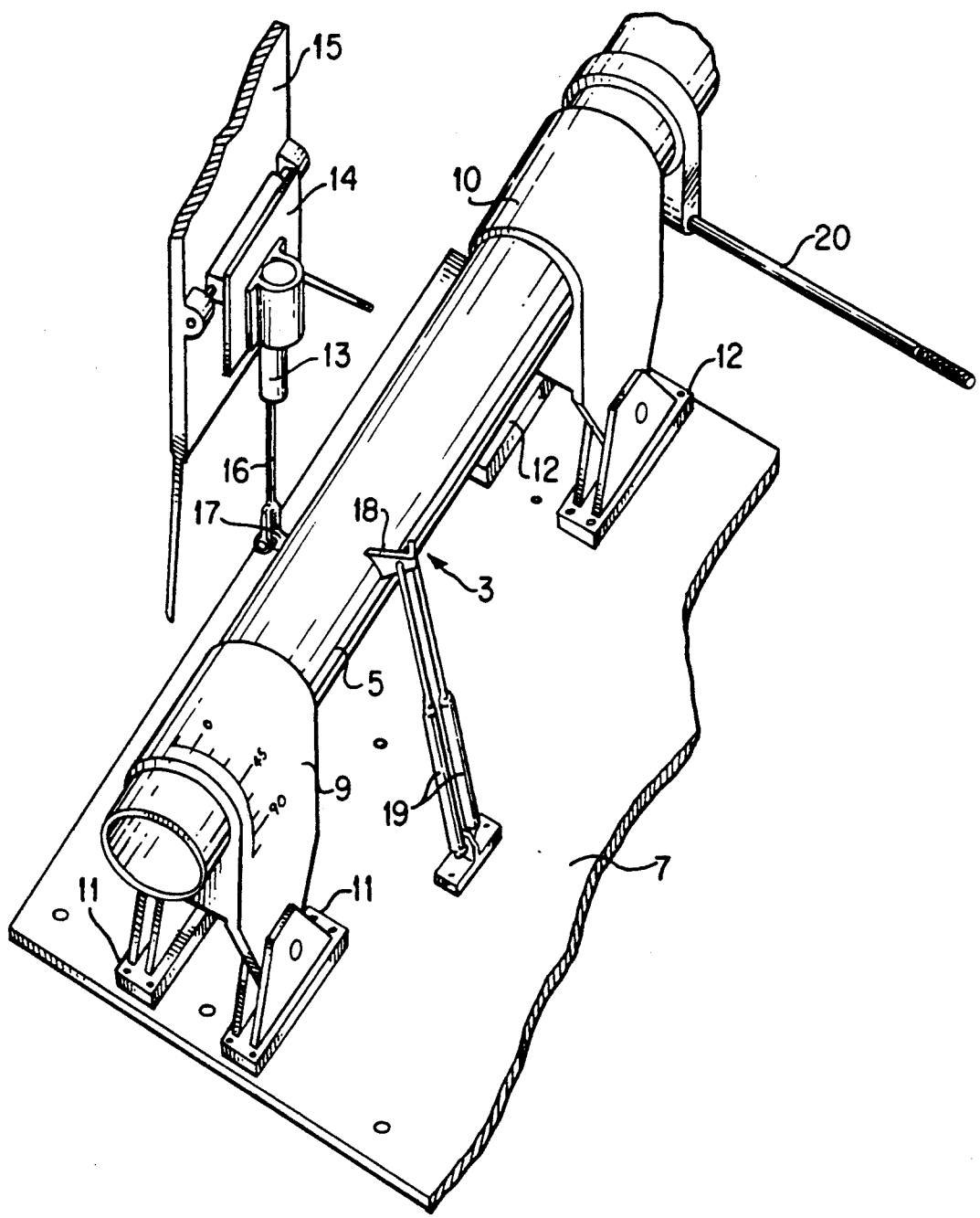
FIG. 7 is a partial axonometric view of the central section of the multi-section helicopter-borne rotatable beam built according to the invention.

With reference to the Figures, 1 indicates a helicopter with doors 2 with holes through which passes the projecting beam 3 of the invention, having a length of over six meters and comprising three sections connected together in succession, 4, 5 and 6 respectively. Between the said holes and side sections 4 and 6 of beam 3 there are also elastic seals 67 (see FIG. 4) which are airtight so that beam 3 may rotate without the operators being disturbed by draughts. The central section 5 of the said beam 3 is a tubular structure supported rotatably on a base 7 bolted to the floor 8 (see FIG. 4) of the cab of helicopter 1, by means of two collars 9 and 10 in turn mounted rotatably in an axial direction on the said base 7 by means of hinged constraints 11 and 12 respectively. The said collars 9 and 10 enable section 5 to rotate round its longitudinal axis under the action of an electric motor (actuator) 13 which, supported by a plate 14 hinged to a vertical structure integral with the said base 7 (see FIG. 7), moves a spindle 16 vertically in both directions hinged in its turn on an arm 17 projecting from one side of the said central section 5. In this way beam 3 may be rotated by up to 105° as is required to change over from nadiral front stereophotographic shots (see FIG. 1) to front stereophotographic shots (see FIG. 3). Furthermore, to balance the inertia of the rotary movement generated by the said actuator 13, on an arm protruding from the opposite side of the said central section 5 is hinged one end of one or more return springs 19 the other end of which is hinged to base 7. Moreover, on one end of central section 5 there is a manual emergency lever 20 to bring the beam into the zero position or attitude of flight as illustrated in FIG. 1 in the event of failure of the said electrical actuator 13. The two said side sections 4 and 6 of beam 3 have a truncated-cone tubular structure tapering towards the outer ends of the beam (see specifically FIG. 4) and each is fixed to the ends of the central tubular section 5 of the said beam by means of a telescope connection of its inner end 21 into one end of the said central section, the said connection being secured in position by means of a tie and half-rings 22 and 23 fixed together with bolts 29 and having an internal annular grove 24 co-operating with flanges 25 and 26 on the ends of central section 5 and the side section respectively, as well as by means of a pin 27 passing through the said sections connected together and a relative safety split pin 28.

Figure 8:
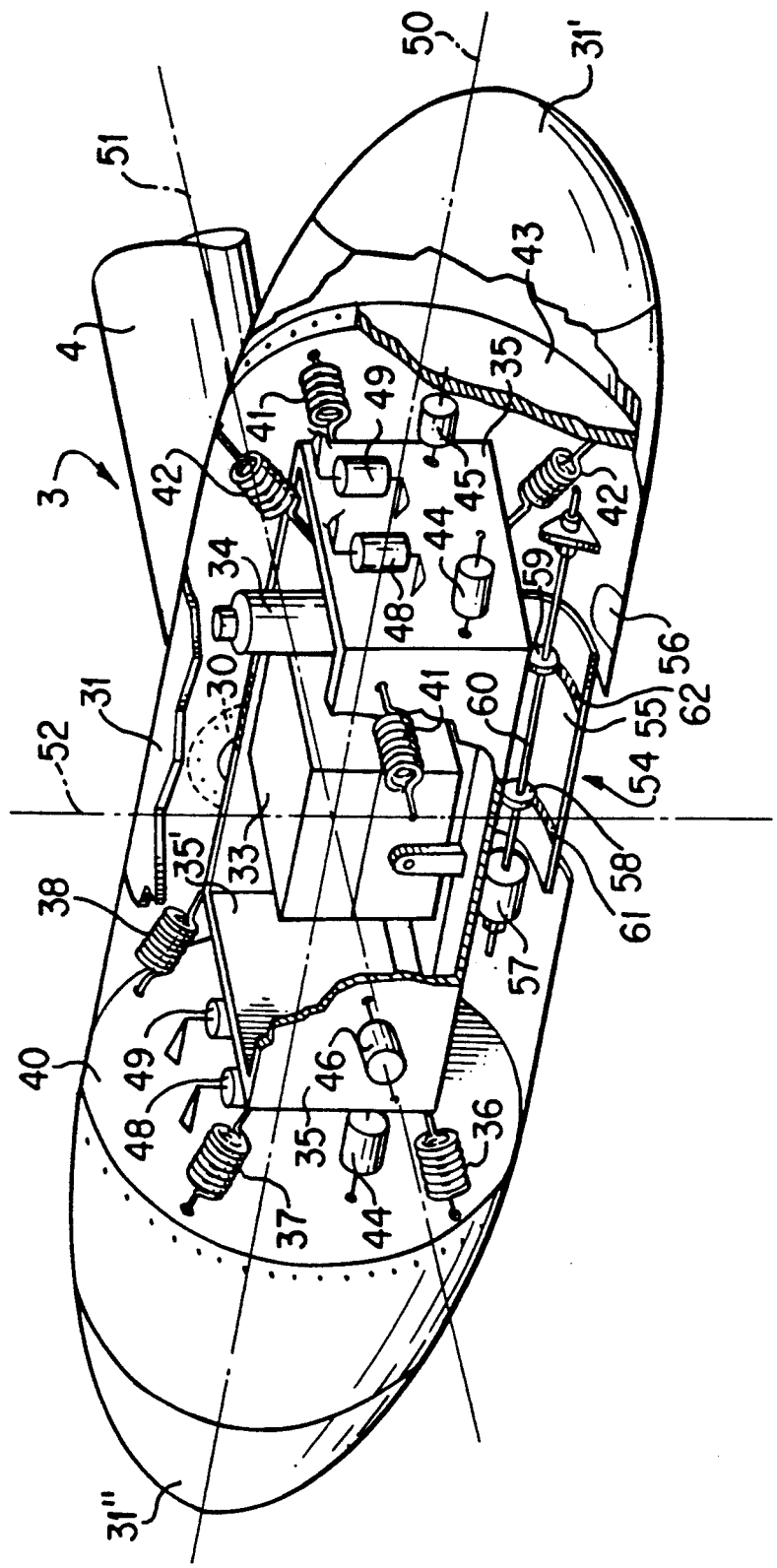
FIG. 8 is a partly sectional axonometric view of the housing or pod of the left-hand camera and television camera of the multi-section helicopter-borne rotatable beam of the invention.
Figure 9:
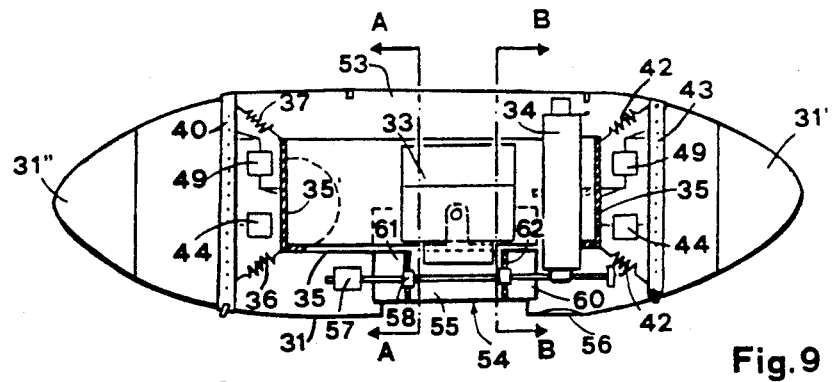
FIG. 9 is a longitudinal cross-section of the left-hand housing or pod shown in FIG. 8.
Figure 10:
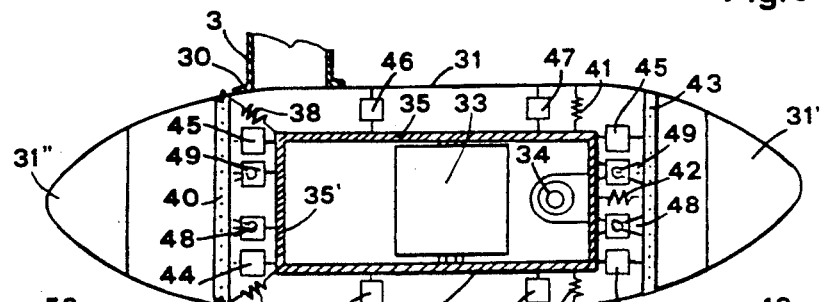
FIG. 10 is a cross-sectional top view of the left-hand housing or pod shown in FIG. 8.
Figures 11, 12:
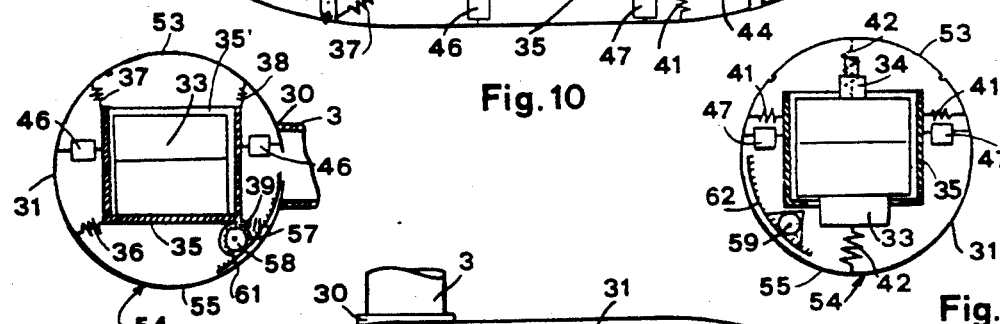
FIG. 11 is a front cross-sectional view of the left-hand housing or pod along Line AA in FIG. 9.
FIG. 12 is a front cross-sectional view of the left-hand housing or pod along Line BB shown in FIG. 9.
Figure 13:
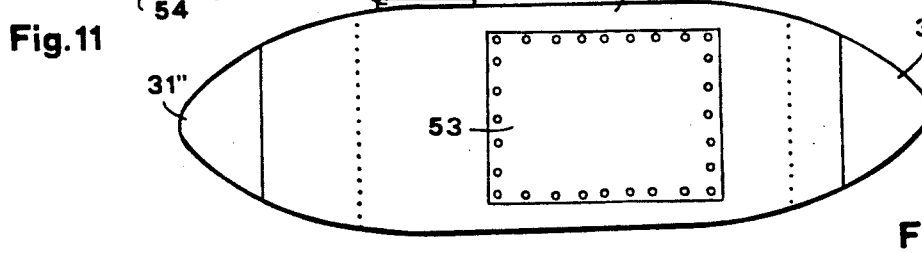
FIG. 13 is a top view of the left-hand housing or pod shown in FIG. 8.
Figure 14:
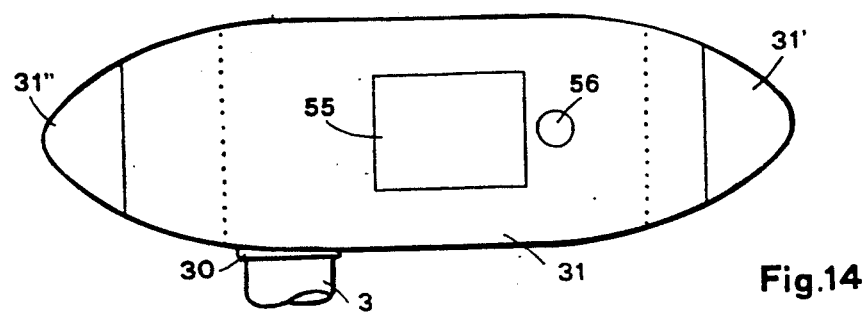
FIG. 14 is a bottom view of the left-hand housing or pod shown in FIG. 8.

At the outer ends of the said side sections 4 and 6 there are also fixed, by means of flanges 30, two cylindrical housings or pods, 31 and 32 respectively, with ogival rear 31', 32' and front ends 31'', 32'', inside each of which a range-finder camera 33 and a television focusing camera 34 are supported removably by a container comprising a prismatic box frame 35 in turn supported by the relative housing 31 or 32 by means of a vibration damping system. The said damping system consists in a set of four springs, 36, 37, 38 and 39 respectively, diverging from the tops of the front face 35' of the said frame 35 and connected to a front supporting plate 40 of the said housing 31 or 32, in a second set of two pairs of return springs 41 and 42 fitted between the rear part of frame 35 and the housing 31 or 32 respectively and a rear support plate 43 of the said housing, as well as in pairs of double-acting return shock absorbers 44 and 45, 46 and 47, 48 and 49 acting along longitudinal 50, transverse 51 and vertical 52 directions respectively (see FIG. 8) of frame 35.

Each cylindrical housing or pod 31 or 32 also has in its upper or dorsal part a wide curved rectangular flap 53 which serves to install and remove the range-finder camera and television focusing camera as well as to replace the camera film backs. In its lower or ventral part the above-mentioned housing has a rectangular window 54 which can be opened by means of an internally-sliding curved door 55 for range-finder camera 33 shots, as well as an aeronautical plexiglass porthole 56, located behind the said window 54, for the continuous focusing of television camera 34. The said curved door 55 is operated, to open window 54, by an electric motor 57 which moves two toothed wheels 58 and 59 which, integral with spindle 60 of the motor, co-operate with the two curved racks 61 and 62 respectively of the said door 55.

Figure 4:
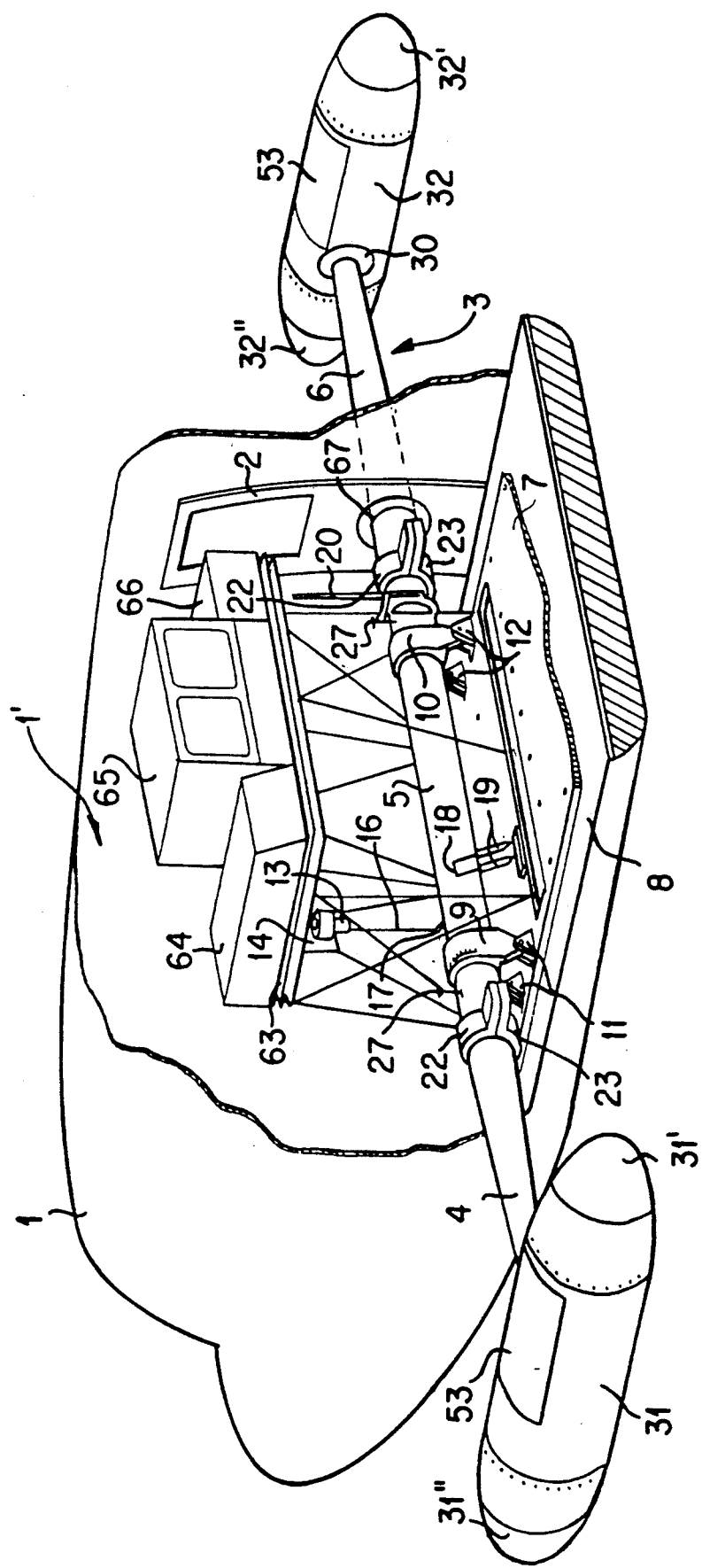
FIG. 4 is an enlarged-scale partly sectional axonometric view of the helicopter and multi-section helicopter-borne rotatable beam built according to the invention.
Figure 5:
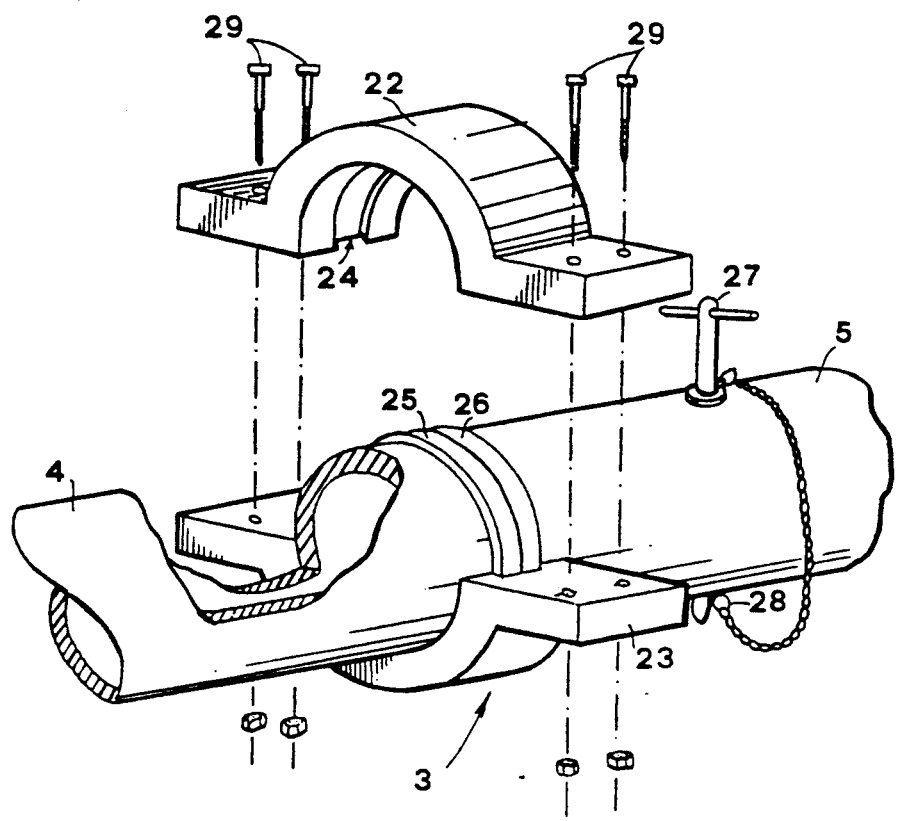
FIG. 5 is an exploded partly sectional axonometric view of a constructional detail of the multi-section helicopter-borne rotatable beam built according to the invention.
Figure 6:
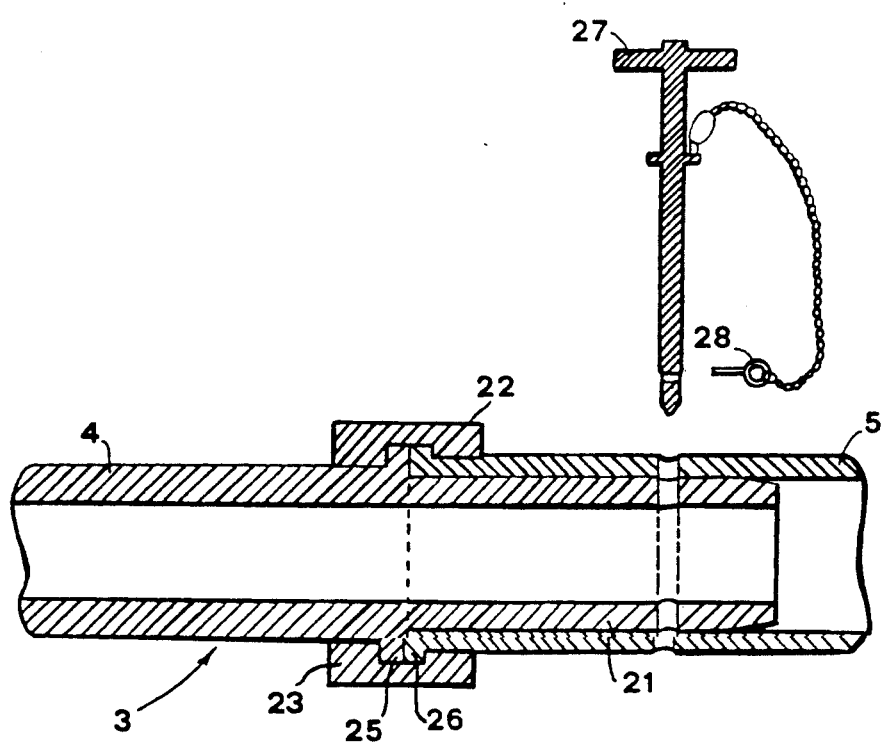
FIG. 6 is a longitudinal cross-section of the constructional detail shown in FIG. 5.

FIG. 4 also illustrates in cab 1' of helicopter 1, supported by a bed 63 integral with the said base 7, both the control panel 64 for operations involving the beam such as its rotation by means of electric actuator 13, the opening, closing and control of the doors 55 of pods 31 and 32 etc., and the instrument systems of television control 65 and operation 66 for the range-finder cameras.

Figure 15:
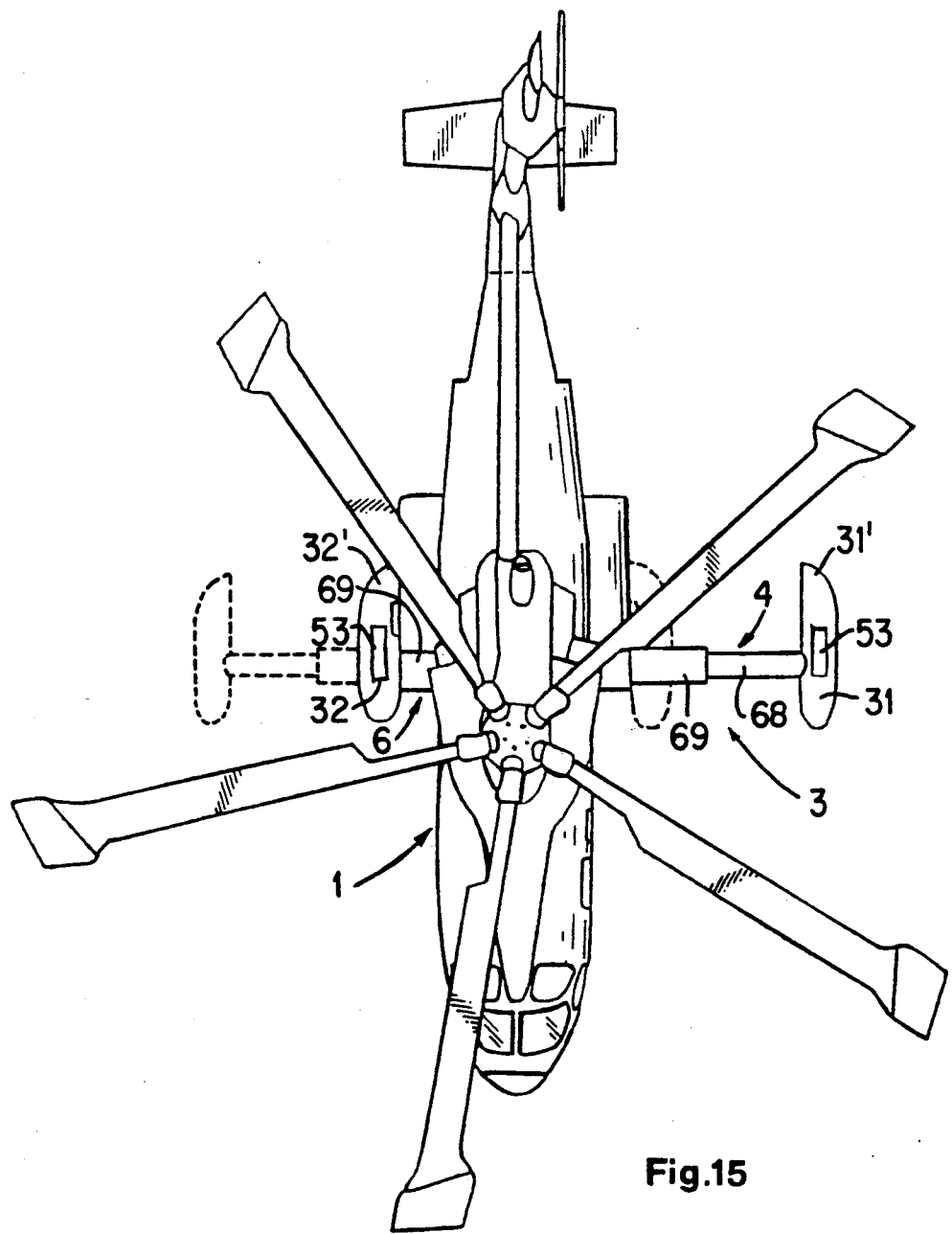
FIG. 15 is a top view of a helicopter fitted with a multi-section helicopter-borne rotatable beam comprising, according to a variant of the invention, several side tubular sections which enter telescopically into the central section of the beam itself.
Figure 16:
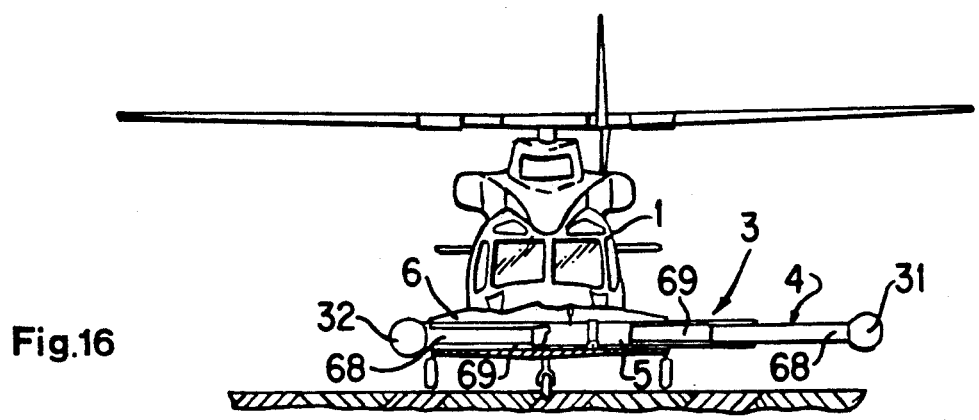
FIG. 16 is a front view of the embodiment shown in FIG. 15.

According to a variant of the invention shown in FIGS. 15 and 16, the said two side sections 4 and 6 of beam 3 each comprise two cylindrical sub-sections 68 and 69 which can be inserted telescopically into each other and into the said tubular central section 5 by means of an electromechanically-controlled device not shown in the Figure. In this case the rear end, 31' and 32' respectively, of the two cylindrical housings or pods is aerodynamically streamlined so as to match perfectly the sides of the helicopter when the side sections 4 and 6 of beam 3 are in the retracted position (see specifically FIG. 15, left-hand side, where the dotted line indicates the section in the extended position).

Figure 17:
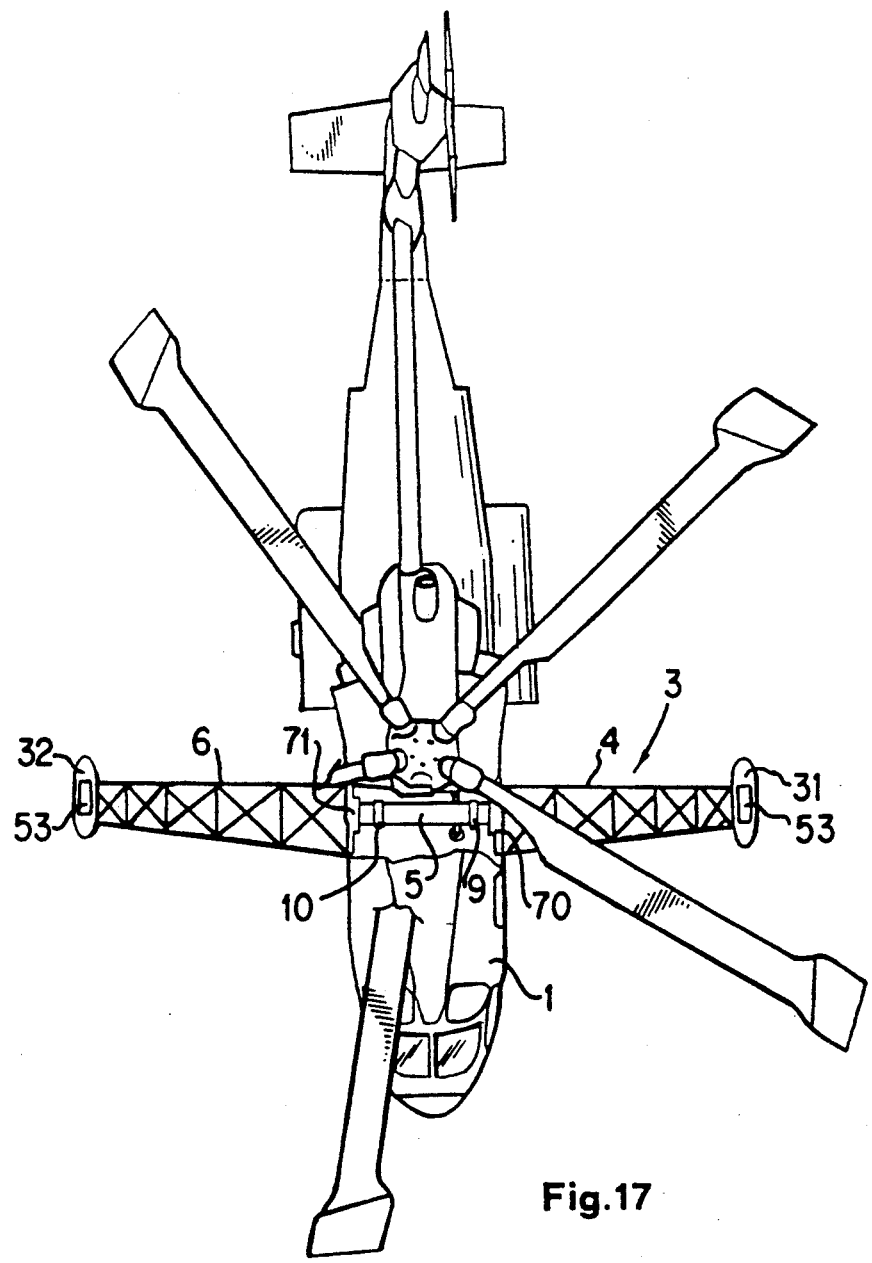
FIG. 17 is a top view of a helicopter fitted with a multi-section helicopter-borne rotatable beam comprising, according to another variant of the invention, a tubular central section at the ends of which are fitted two lattice-structure fixed side sections.
Figure 18:
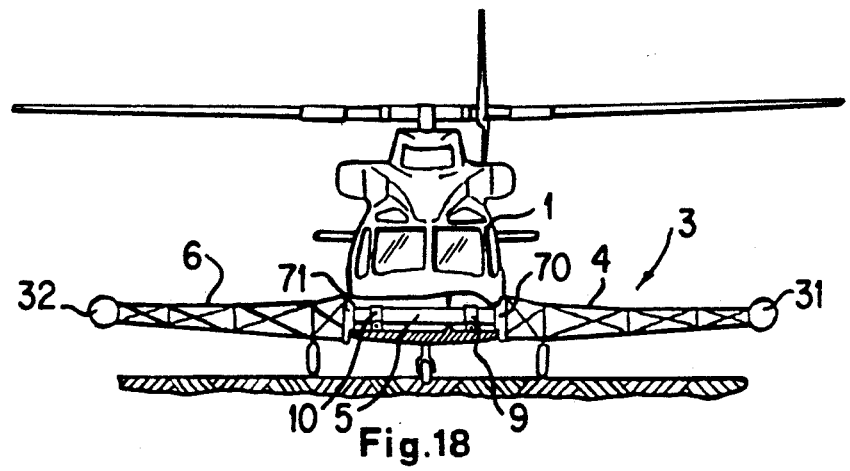
FIG. 18 is a front view of the embodiment shown in FIG. 17.

According to another variant of the invention illustrated in FIGS. 17 and 18, the two said side sections 4 and 6 of beam 3 comprise two truncated-pyramid lattice structures tapered towards the outer ends of the beam, which are rigidly fixed to the ends of the said central section 5 by means of flanges 70 and 71.

Lastly, according to an additional variant of the invention shown in FIGS. 19-21, the two said side sections 4 and 6 of beam 3 comprise two truncated-pyramid sections tapered towards the outer ends of the beam, which are hinged, at 72 and 73 respectively, with their inner rear end to the sides of helicopter 1 and can be folded back, in the direction shown by arrow 74, against the said sides by the action of hydraulic jacks 75 hinged between the said sides and the inner front end 76 of the said lattice structures 4 and 6 respectively. In this case the relative cylindrical housings or pods 31 and 32 are each supported rotatably at the outer ends of the said lattice structures 4 and 6 by means of a supporting plate 77 hinged with its spindle 78 to the outer end of the said structure, the said plate is rotated by an electric repeater motor 79 (Veltro) which, mounted on the said plate 77 and controlled by the electrical actuator 13 which operates the said central section 5 of beam 3, which in this case acts as a master motor, operates an endless screw 80 co-operating with a circular rack 81 integral with the lattice structure. Moreover, the said cylindrical housings or pods 31 and 32 are in this case used without their ogival ends, as clearly visible in FIG. 21, since these would interfere with the folding back of side sections 4 and 6.

I claim:

1. A multi-section helicopter-borne rotatable beam, in the order of over 6 meters long, for supporting at either of its ends two range-finder cameras and two television focusing cameras for stereophotogrammetric surveys, said beam projecting beyond the two sides of a helicopter at right angles to the helicopter's axis and comprising a multi-section structure of which the cylindrical central section and side sections are connected together in succession by securing means and in which the central section is supported rotatably by supporting means mounted on a base or bed which in its turn is fixed to the floor of the helicopter cab, and is made to rotate around its longitudinal axis by operating means, said beam supporting at its ends two cylindrical housings or pods with ogival rear and front ends for said range-finder cameras and television focusing cameras which operate through openings in said housings or pods and are supported removably in containers connected to the respective housings or pods by means of a vibration damping system, characterised in that said side sections are truncated-cone tubular structures tapered towards the outer ends of the beam, that said securing means comprise a telescopic connection of the inner ends of said side sections respectively in the ends of said central section of the beam, said connection being secured in position by means of half-ring ties with an internal annular groove co-operating with appropriate flanges on the ends of the central section and on said side sections respectively, as well as by means of pins passing through said sections connected together and safety split pins, that said means of support of the central section consists in two collars mounted rotatably in an axial direction on said base by means of hinged constraints, that said operating means make said central section of the beam rotate by up to about 105° and consist in an electric actuator supported by a plate which is integral with said base, said actuator vertically moving in both directions a spindle hinged on an arm projecting from one side of said central section, there being hinged on an arm projecting from the opposite side of the latter central section one or more return springs and on one end of said central section there being also a lever for manual emergency rotation of said section, that said openings in each of said housings or pods consist in a ventral rectangular window which can be opened by means of a curved internally-sliding door operated by an electric motor which moves toothed wheels co-operating with curved racks of said door, for the range-finder camera shots, as well as in an aeronautical plexiglass porthole, located behind the above-mentioned window, for the television focusing camera, and that the above-mentioned containers for said cameras each comprise a prismatic box frame whose vibration damping system consists in a set of four springs diverging from the tops of the front part of said frame, in a second set of two pairs of return springs fixed to the rear part of the frame as well as in pairs of double-acting return shock absorbers acting along the longitudinal, transverse and vertical directions of the frame itself.

2. A multi-section helicopter-borne rotatable beam according to claim 1, characterised in that the said two side sections which support at their outer ends said cylindrical housings or pods respectively each comprise two cylindrical sub-sections which can be inserted telescopically into each other and into said central section by means of an electromechanical control device, the rear end of said cylindrical housings or pods being streamlined so as to match aerodynamically the configuration of the helicopter sides.

3. A multi-section helicopter-borne rotatable beam according to claim 1, characterised in that the two said side sections which support at their outer ends said cylindrical housings or pods comprise two truncated-pyramid lattice structures tapered towards the outer ends of the beam, which are rigidly fixed to the ends of said rotatable central section of the beam itself.

4. A multi-section helicopter-borne rotatable beam according to claim 1, characterised in that said two side sections which support at their outer ends said cylindrical housings or pods comprise two truncated-pyramid side structures tapered towards the outer ends of the beam, which are hinged by their inner rear end to the sides of the helicopter and can be folded back against said sides by means of the action of hydraulic jacks hinged between said sides and the inner front end of said lattice structures respectively, said cylindrical housings or pods being supported rotatably to the outer end of said lattice structures each by means of a supporting plate pivoting on the outer end of said structure and rotated by an electric repeater motor (Veltro) mounted on said supporting plate and operating an endless screw co-operating with a circular rack which is integral with said lattice structure, said motor being in its turn controlled by said electrical actuator which operates said central section of the beam.

* * * * *